(12) United States Patent
Yamada et al.

(10) Patent No.: US 6,452,908 B1
(45) Date of Patent: Sep. 17, 2002

(54) ROUTE SEARCHING CIRCUIT AND COMMUNICATION APPARATUS USING THE SAME

(75) Inventors: Kenshin Yamada; Motoo Nishihara, both of Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/216,943

(22) Filed: Dec. 21, 1998

(30) Foreign Application Priority Data

Dec. 25, 1997 (JP) .............................. 9-356774

(51) Int. Cl.[7] .................. H04L 12/28; H04L 12/56
(52) U.S. Cl. ................. 370/256; 370/392; 370/408; 709/242
(58) Field of Search ................ 370/400, 401, 370/402, 474, 466, 392, 254, 256, 408; 711/100, 6; 709/238, 242

(56) References Cited

U.S. PATENT DOCUMENTS

| 5,355,371 A | 10/1994 | Auerbach et al. ............. 370/60 |
| 5,999,536 A | * 12/1999 | Kawafuji et al. ........... 370/401 |
| 6,128,666 A | * 10/2000 | Muller et al. ............... 709/238 |

FOREIGN PATENT DOCUMENTS

| JP | 2-206237 | 8/1990 |
| JP | 4-140948 | 5/1992 |
| JP | 4-352534 | 12/1992 |
| JP | 6-62029 | 3/1994 |
| JP | 7-143156 | 6/1995 |
| JP | 7-254912 | 10/1995 |
| WO | WO97/13345 | 4/1997 |
| WO | WO 99/14906 | 3/1999 |

* cited by examiner

Primary Examiner—Alpus H. Hsu
Assistant Examiner—Duc Ho
(74) Attorney, Agent, or Firm—Foley & Lardner

(57) ABSTRACT

A communication control apparatus includes an input and output unit responsive to reception of a packet, for generating a search request and a destination address of the packet to receive a resultant route data, and for transmitting the packet based on the resultant route data. A memory stores a route tree table having a tree structure of a plurality of nodes, each of which has a node data. A route searching circuit refers to the route tree table in response to the search request to determine a route data of a final node data as the resultant route data from the destination address, and outputs the resultant route to the input and output unit.

19 Claims, 7 Drawing Sheets

ROUTE SEARCHING CIRCUIT AND COMMUNICATION APPARATUS USING THE SAME

BACKGROUND OF THE INVENTION

1. Field of the Invention

The present invention relates to a route searching circuit for determining an apparatus to which a packet should be transferred, based on a destination address which specifies a transmission destination of the packet. Also, the present invention relates to a communication apparatus such as a router which uses the route searching circuit.

2. Description of the Related Art

A route searching circuit determines a network address which is defined based on an address such as an IP address on the internet and a mask length.

As an apparatus for relaying a packet data between networks or local area networks (LANs) connected to each other, an apparatus such as a bridge and a router is well known. In an Open Systems Interconnection (OSI) reference model which is defined by the International Organization for Standard (ISO), the bridge performs the connection in a data link layer, especially, a media access sub-layer. The router performs the connection in a network layer which is the upper layer of the data link layer.

A communication control apparatus which is called the bridge or the router needs to determine which apparatus the reception packet received through the network should be next transmitted to, based on a route table data which is previously provided for the communication control apparatus.

In this determination processing, it is generally determined based on the address stored in an address field of a reception packet data that the reception packet data should be transmitted to which apparatus.

The address used in an LAN will be described below simply.

As the address used on the LAN, there are known the address such as a MAC address in an ethernet network and an ATM address in an ATM network which is physically peculiar to the apparatus, a network number of a network to which the apparatus is connected, and a network address indicating a number of the apparatus on the network.

The data transmitted on the LAN generally contains network addresses of a transmission destination and transmission origin in the network layer. As the internet work address, for example, an IP address of 32 bits in the TCP/IP protocol is well known. In the following explanation, the IP address is used.

A router refers to a destination IP address of the received packet to determine that the router should next transmit the packet to which router or terminal. In this determining process, it is first determined which network address the destination IP address of the received packet belongs to. Then, a physical address of the transmission destination corresponding to the network address is determined. The network address is determined based on the IP address and the mask length. The mask length is the data that a predetermined number of bits of the IP address from the most significant bit are significant.

FIG. 1 shows an example of the network address. Referring to FIG. 1, because the mask length is "16", it can be found that the upper 16 bits of the IP address of "800A0000" is valid as the network address. When the mask length is "16", the mask address of "FFFF0000" that each of the upper 16 bits is "1" and each of the lower 16 bits is "0" is defined.

When a result of logical product of the above mask address and the destination IP address of the received packet is coincident with the IP address of "800A0000", the destination IP address is coincident with the network address. For example, when the destination IP address is "800A40C8", the logical product of the destination IP address of "800A40C8" and the mask data of "FFFF0000" is calculated. As a result, the address of "800A0000" is obtained. This is coincident with the IP address of "800A0000". Thus, the destination IP address is coincident with the network address.

In a conventional example, the correspondence of the destination IP address and the network address could be simply solved under the concept of "class". More specifically, when each of the upper bits of the IP address is "0", the IP address belongs to a class A and the mask length is 8 bits. When the upper bit of the IP address is "10", the IP address belongs to a class B and the mask length is 16 bits. When the IP address is "100", the IP address belongs to a class C and the mask length is 24 bits.

At present, the concept of the class is demolished through the spread of subnets and Classless Internet Domain Routing (CIDR). Thus, the network address can not be simply determined from the destination IP address. It takes a long processing time for the determination of the network address. Also, in the network which adopts CIDR, there is a case where one or more network addresses in the route table are coincident with the destination IP address. In this case, the route data of the network address with the longest mask length must be adopted.

However, in a conventional router apparatus of the Internet, the route solution processing for determining based on the destination IP address that a packet should be transmitted to which apparatus is realized by software.

As described above, in a conventional communication control apparatus such as a bridge and a router, there is a problem that it takes a very long processing time for the solution of the route data for packet transfer in the network which has a lot of route data. Especially, in the packet transfer in the network in which there are one or more network addresses matching to an address, the algorithm to solve the network address becomes complicated. Therefore, the determination of the route data takes more time. For these reasons, the throughput of the packet transfer processing decreases in the packet transfer apparatus. This is because a specific route data corresponding to the destination address is searched from a lot of route data by the software.

In addition to the above conventional examples, a routing system is described in Japanese Laid Open Patent Application (JP-A-Heisei 2-206237). In the routing system, a connection apparatus includes an address table for a sub-tree. When a communication frame is received, the address table is referred to. When a destination address is exist in the address table, the communication frame is transferred to a link corresponding to the destination address.

Also, an address comparing system is described in Japanese Laid Open Patent Application (JP-A-Heisei 4-352534). In the address comparing system, an address common section Acom of terminal addresses Al to An set for a plurality of terminal equipments 1-1 to 1-n is stored in an address register 2. A portion of a terminal address of a reception address RA corresponding to the address common section Acom is compared with the value of the address register 2. More specifically, a control register 4 is provided to have mask bits in which presence or non-presence of address comparison is set in units of bits. The address register 2 value and the reception address RA are compared by a comparing section 3 based on the mask bits of the control register 4.

Also, a communication network system is described in Japanese Laid Open Patent Application (JP-A-Heisei 6-62029). In the communication network system, a distribution tree is generated based on tree addresses by a tree leader. A tree address correlation is generated using a network identifier and a node identifier, and a list of connected nodes is generated for every member of the multicast tree set.

Also, a LAN connecting apparatus is described in Japanese Laid Open Patent Application (JP-A-Heisei 7-254912). In the LAN connecting apparatus, an IP header 4 is detected from a reception communication packet 5, and a destination IP address is detected from the IP header 4. An output port number and the destination target IP address corresponding to the IP address are searched from the routing table 11a storing target IP addresses and an output port number for designating a transmission destination LAN for every IP address.

Also, a memory is described in Japanese Laid Open Patent Application (JP-A-Heisei 7-143156). In the memory, an input register for storing an L-bit data and M data base registers for storing X-bit data. The content of the input register is compared with each of the M data base registers in units of bits. When all bits are coincident with each other in one or more of the M registers, a coincidence signal is outputted. A data base mask register is provided for each of the M data base registers to designate whether the comparing operation is to be performed in units of bits.

Also, a route determining apparatus is described in Japanese Laid Open Patent Application (JP-A-Heisei 4-140948). In the route determining apparatus, there is a node address register for storing an address to determine a communication route of a node. Also, an upper mesh register, a gate way address register and a channel bit register are provided. An exclusive OR of the value of the node address register and the destination node address is calculated, and the calculation result is masked with the value of the upper mesh register. When the masked value is not 0, a destination unit is determined from the value of the gate way register. When the masked value is 0, the exclusive OR calculating result is masked with the value of the channel bit register for every communication unit. When the masked data is not 0, a communication request is issued. Then, one is selected from the communication units which issue the transmission requests.

SUMMARY OF THE INVENTION

The present invention is accomplished to solve the above problems. Therefore, an object of the present invention is to provide a route searching circuit in which the time required to determine a route can be reduced, so that the load to a CPU can be reduced.

Another object of the present invention is to provide a communication control apparatus using such a route searching circuit.

In order to achieve an aspect of the present invention, a communication control apparatus includes an input and output unit responsive to reception of a packet, for generating a search request and a destination address of the packet to receive a resultant route data, and for transmitting the packet based on the resultant route data. A memory stores a route tree table having a tree structure of a plurality of nodes, each of which has a node data. A route searching circuit refers to the route tree table in response to the search request to determine a route data of a final node data as the resultant route data from the destination address, and outputs the resultant route to the input and output unit.

The route searching circuit includes a next node selecting circuit for referring to the route tree table using the destination address and a predetermined mask data in response to the search request to retrieve a first next node data, for repeatedly referring to the route tree table using an address and mask data of a current node data to retrieve a second next node data, while the first next node data or the second next node data is set as the current node data, until the final node data is obtained.

The route tree table may have a dichotomy tree structure, and each of the plurality of nodes as a parent node is connected to a left child node and a right child node. In this case, the next node selecting circuit selects one of the left child node and the right child node based on a set of the destination address and a predetermined mask data or a set of the address and mask data of the current node data each time the route tree table is referred to.

Also, the next node selecting circuit may select one of the left child node and the right child node based on a (the mask data +1)-th bit of the destination address. In this case, when the next node selecting circuit refers to the route tree table based on a node number, the next node selecting circuit includes a first selector for determining an evaluation bit based on the mask data and the destination address, a second selector for selecting one of a number of the left child node and a number of the right child node based on the evaluation bit, a storing circuit for storing a top node number, and a third selector for selecting one of a top node number and the selected child node number in response to the search request.

Also, the route searching circuit may further include a search end determining circuit for determining whether the final node data is obtained. In this case, the search end determining circuit desirably determines that the final node data is obtained, when there is no node to be referred to or when the second next node data includes an invalidity indicating data.

Also, the route searching circuit may further include a route updating circuit for selectively updating a held route data to a route data of the first or second next node data. In this case, the route updating circuit may update the held route data to the route data of the first or second next node data, when a logical product of the mask data and the destination address is coincident with the address of the first or second next node data. Also, the route updating circuit may include a masking circuit for masking the destination address using the mask data, an address comparing circuit for comparing the masked destination address and the address of the first or second next node data, and a resultant route data updating circuit for updating the held route data to the route data of the first or second next node data, when the masked destination address is coincident with the address of the first or second next node data, and when a validity data of the first or second next node data indicates that the route data of the first or second next node data is valid.

Further, the route searching circuit includes a next mask selecting circuit for selecting one of a right child node mask data and left child node mask data of the route data as a selected child node mask data for a next clock cycle based on an evaluation bit determined based on the destination address and the selected child node mask data for a current clock cycle.

In this case, the route searching circuit may include a next node selecting circuit for referring to the route tree table using the destination address and a predetermined mask data in response to the search request to retrieve a first next node data including the right child node mask data and the left child node mask data, for repeatedly referring to the route tree table using an address of a current node data and the selected child node mask data to retrieve a second next node data including the right child node mask data and the left child node mask data, while the first next node data or the second next node data is set as the current node data, until the final node data is obtained.

The route tree table may has a dichotomy tree structure, and each of the plurality of nodes as a parent node is connected to a left child node and a right child node. Also, the next node selecting circuit selects one of the left child node and the right child node based on a set of the destination address and a predetermined mask data or a set of the address of the current node data and the selected child node mask data each time the route tree table is referred to.

Also, the next node selecting circuit may select one of the left child node and the right child node based on a (the selected child node mask data +1)-th bit of the destination address. In this case, the next node selecting circuit refers to the route tree table based on a node number. The next node selecting circuit may include a first selector for determining an evaluation bit based on the selected child node mask data and the destination address in the current clock cycle, a flip-flop circuit for holding the evaluation bit to output in the next clock cycle, a second selector for selecting one of a number of the left child node and a number of the right child node based on the evaluation bit in the next clock cycle, a storing circuit for storing a top node number, and a third selector for selecting one of the top node number and the selected child node number in the next clock cycle in response to the search request.

Further, the route searching circuit further includes a search end determining circuit for determining whether the final node data is obtained. In this case, the search end determining circuit determines that the final node data is obtained, when there is no node to be referred to or when the second next node data includes an invalidity indicating data.

In addition, the route searching circuit may further include a route updating circuit for selectively updating a held route data to a route data of the first or second next node data. In this case, the route updating circuit updates the held route data to the route data of the first or second next node data, when a logical product of the selected child node mask data and the destination address is coincident with the address of the first or second next node data. Also, the route updating circuit may include a masking circuit for masking the destination address using the mask data in the current clock cycle, a flip-flop for holding the masked destination address to output in the next clock cycle, an address comparing circuit for comparing the masked destination address and the address of the first or second next node data in the next clock cycle, and a resultant route data updating circuit for updating the held route data to the route data of the first or second next node data in the next clock cycle, when the masked destination address is coincident with the address of the first or second next node data, and when a validity data of the first or second next node data indicates that the route data of the first or second next node data is valid.

In order to achieve another aspect of the present invention, a method of determining a route to a destination unit based on a destination address of a packet in a communication control apparatus, includes the steps of:

generating a search request and a destination address of a packet;

referring to a route tree table in response to the search request to determine a route data of a final node data as the resultant route data from the destination address, the route tree table having a tree structure of a plurality of nodes, each of which has a node data; and transmitting the packet to a destination unit based on the resultant route data.

The referring step may include repeatedly referring to the route tree table using the destination address and a predetermined mask data or using an address and mask data of a current node data to retrieve a second next node data, while the first next node data or the second next node data is set as the current node data, until the final node data is obtained.

In this case, the repeatedly referring step may include selecting one of a right child node mask data and left child node mask data of the route data as a selected child node mask data for a next clock cycle based on an evaluation bit determined based on the destination address and the selected child node mask data for a current clock cycle.

DESCRIPTION OF THE PREFERRED EMBODIMENTS

A communication control apparatus using a route searching circuit of the present invention will be described below in detail with reference to the attached drawings.

Figure 1A:
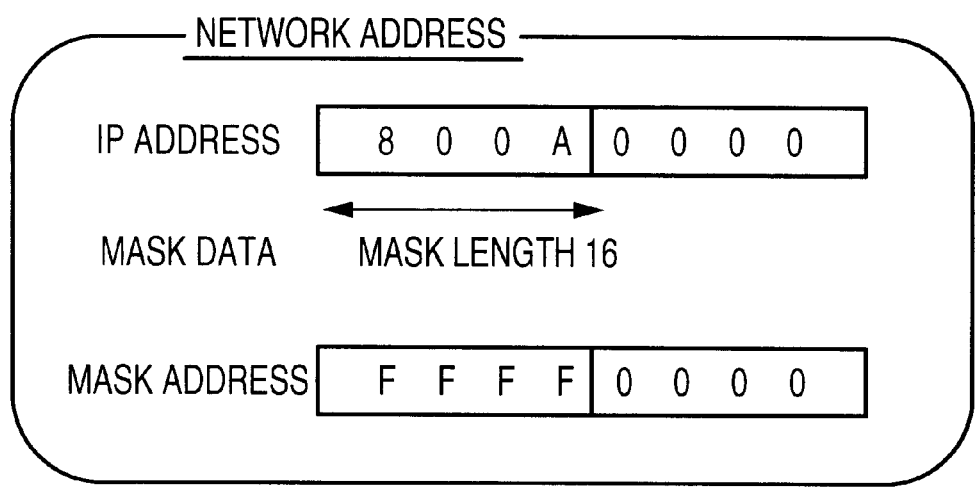
FIG. 1A is a diagram illustrating an example of a network address.
Figure 1B:
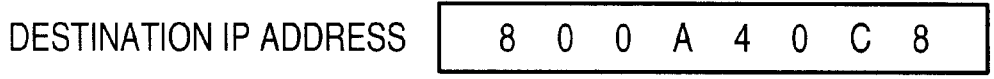
FIG. 1B is a diagram illustrating a destination address.
Figure 2:
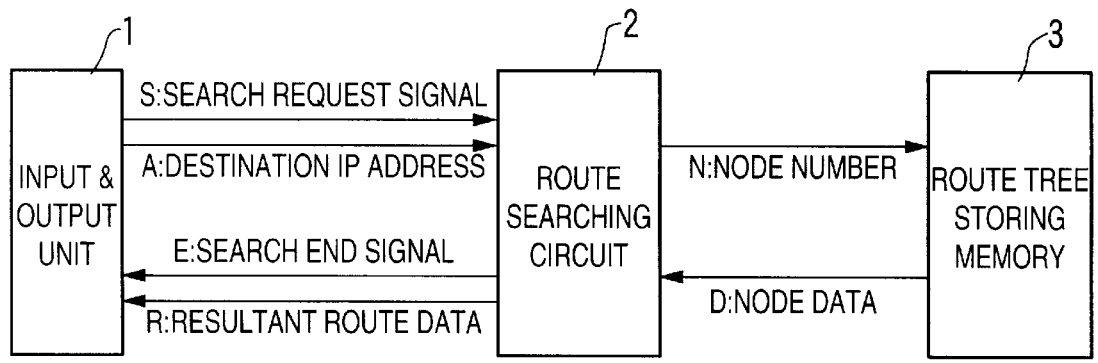
FIG. 2 is a block diagram illustrating the structure of a communication control apparatus using a route searching circuit according to a first embodiment of the present invention.

First, the communication control apparatus using the route searching circuit according to the first embodiment of the present invention will be described below. FIG. 2 is a block diagram illustrating the structure of the communication control apparatus according to the first embodiment of the present invention.

The communication control apparatus in the first embodiment is, for example, a bridge or a router. The communication control apparatus is composed of an input and output unit 1 such as a central processing unit (CPU), a route searching circuit 2 for performing a route search process, and a route tree storing memory 3 for storing route data in the form of a dichotomy tree structure.

The input and output unit 1 is an apparatus for processing a reception packet. The input and output unit 1 issues a search request signal S of the route data to the route searching circuit 2 together with a destination IP address A. Also, the input and output unit 1 determines the destination of the reception packet based on a resultant route data R outputted from the route searching circuit 2.

The route searching circuit 2 performs the search of the route data corresponding to the destination IP address A, when the search request signal S and the destination IP address A are inputted from the input and output unit 1. Then, the route searching circuit 2 outputs a search end signal E and the resultant route data R to the input and output unit 1, after the search ends. The route searching circuit 2 supplies a node number N to the route tree storing memory 3 to acquire a node data D, and compares the destination IP address A and the node data D.

As the route searching circuit 2, it is desirable that a high-speed logic circuit such as an LSI (Large Scale Integrated Circuit). However, a programmable logic device (PLD) may be used in consideration of a short development period and reduction of a manufacturing cost.

The route tree storing memory 3 is desirably composed of a high-speed SRAM (Static Random Access Memory). However, if it is possible to provide a large capacity of high speed storage block in an LSI, the route tree storing memory 3 is desirably provided in the LSI in which the route searching circuit 2 is provided. This is because the processing speed can be increased to a large extent in addition to a small circuit size.

A table 1 shows an example of the route table which is stored in the route tree storing memory 3.

that is, the length of the mask. The mask data takes a value of 0 to 32 bits.

A right child node number Dc is a node number of the right side child node which is connected to the node with the node number N as a parent node.

A left child node number Dd is a node number of the left side child node which is connected to the node with the node number N as a parent node.

A route valid flag De indicates whether or not the node has the route data. When the node has a route data, the route valid flag De is set to the value indicating validity, e.g., "1". Also, when the node does not have any route data, the route valid flag De is set to the value indicating invalidity, e.g., "0".

A route data Df is a data which is necessary to determine where the reception packet having the destination IP address A which is coincident with the network address of the node which has this route date Df should be transferred. In this embodiment, this route data Df data is used as an address which is peculiar to the transmission destination apparatus.

Figure 3:
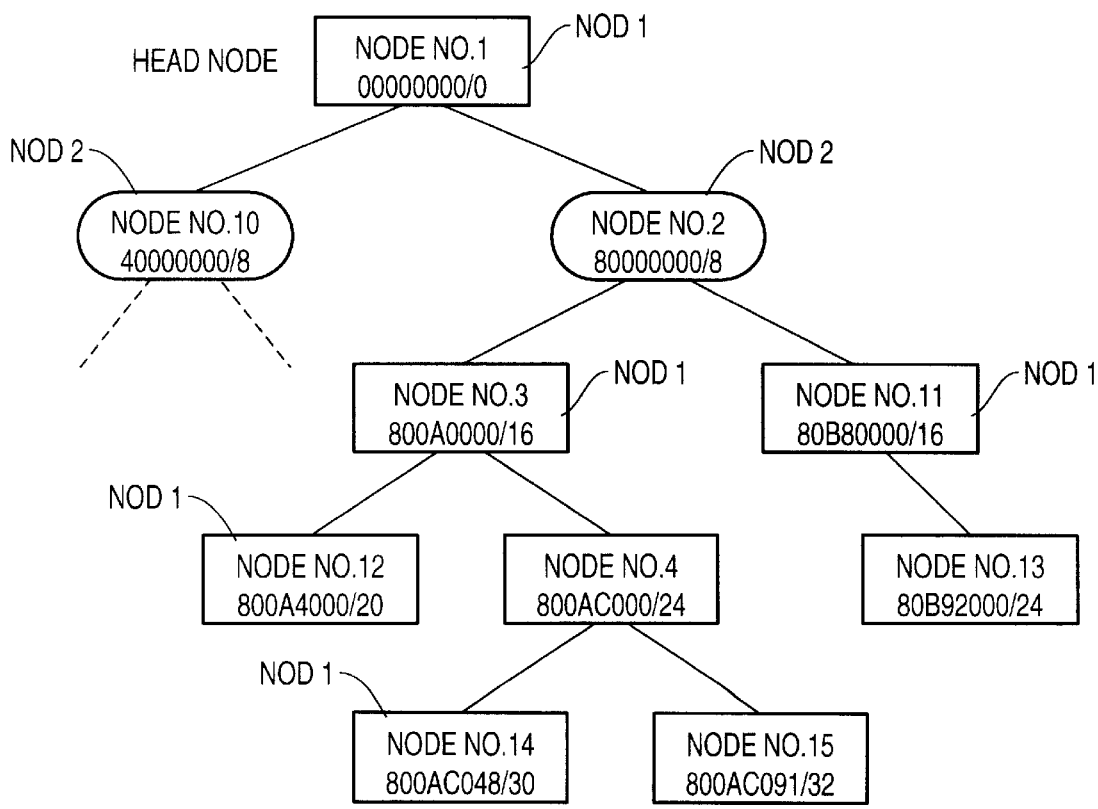
FIG. 3 is a diagram illustrating a route tree corresponding to a route table.

FIG. 3 is a diagram illustrating the route tree which corresponds to the route table shown in the table 1. In FIG. 3, "NOD1" indicates the node which has the route data Df, and "NOD2" indicates the node which does not have the route data Df. A numerical value of the upper section in the block of each node is a node number N. Also, a numerical value before the symbol "/" in the lower section is an IP address Da, and a numerical value after the symbol "/" indicates the mask data Db.

In the route tree in this embodiment, it is supposed that the IP address Da which a node (a route entry) as an object to be structured has is a bit string. A node that the evaluation bit in the IP address Da is "0" is arranged as a child node in the lower left of the parent node. A node that the evaluation bit is "1" is arranged as the 5 child node in the lower right of the parent node. Thus, a dichotomy tree is structured. Unnecessary branch is removed in order to speed up the searching operation.

Each node has two child node numbers as a node data D, i.e., a right child node number Dc and a left child node number Dd. Thus, the connection relation with the child nodes is defined.

The above evaluation bit is determined based on the mask data Db. More specifically, when the mask length of the mask data Db is m, the an evaluation bit is the (m+1)-th bit of the IP address Da from the uppermost bit.

TABLE 1 route table node detaD

| node No. | IP addressDa | musk deta Db | right child node No. Dc | left child node No. Dd | route valid flug De | route data Df |
|---|---|---|---|---|---|---|
| 1 | 00000000 | 0 | 2 | 10 | valid | Df1 |
| 2 | 80000000 | 8 | 11 | 3 | non-valid | non |
| 10 | 40000000 | 8 | 16 | 17 | non-valid | non |
| 11 | 80B80000 | 15 | 13 | non | valid | Df11 |
| 3 | 800A0000 | 16 | 4 | 12 | valid | Df3 |
| 4 | 800AC000 | 24 | 15 | 14 | valid | Df4 |
| 12 | 800A4000 | 20 | non | non | valid | Df12 |
| 13 | 80B92000 | 24 | non | non | valid | Df13 |
| 14 | 800AC048 | 30 | non | non | valid | Df14 |
| 15 | 800AC091 | 32 | non | non | valid | Df15 |

The node number N is equivalent to an address of a memory. When the node number N is inputted, the node data D as information of each node (a route entry) can be read. The node data D is composed of an IP address Da, a mask data Db, a right child node number Dc, a left child node number Dd, a route valid flag De, and a route data Df.

Each node corresponds to a network address which is defined by the IP address Da and the mask data Db. The IP address Da is represented in the hexadecimal notion in the table 1.

The mask data Db describes the length of the effective address of a network address in the IP address Da of 32 bits, Also, the evaluation bit is shifted from the upper bit of the IP address Da to a lower bit as the searching operation is performed to the route tree in the lower direction. Therefore, the value of the mask data Db becomes large as the searching operation is performed to the route tree in the lower direction.

It should be noted that when unnecessary branch is removed so as to speed up the searching operation, the evaluation bit does not change continuously as the first bit of the IP address Da, the second bit, the third bit . . . , but changes discretely as the first bit of the IP address Da, the ninth bit, the 16th bit . . . .

Next, a specific method of structuring the route tree shown in FIG. 3 will be described below.

First, the mask data Db of the top node with the node number of "1" has is "0". Accordingly, the first evaluation bit is the first bit of the IP address Da of the concerned node. Because there are a node with the node number of "2" and a node with the node number of "10" as the nodes having the smaller mask data Db next to the top node, these nodes are set as the concerned nodes.

The IP address Da of the node with the node number of "2" is "80000000". Because the value of the evaluation bit of this IP address Da is "1", the node with the node number of "2" is arranged in the lower right of the top node as a parent node. On the other hand, the IP address Da of the node with the node number of "10" is "40000000". Also, the value of the evaluation bit of this IP address Da is "0". Therefore, the node with the node number of "10" is arranged in the lower left of the top node as the parent node.

Next, the mask data Db of the node with the node number of "2" is "8". Accordingly, the next evaluation bit is the ninth bit of the IP address Da of the concerned node.

Because there are a node with the node number of "11" and a node with the node number of "3" as the nodes with the next smaller value of the mask data Db. These node are set as the concerned node. The IP address Da of the node with the node number of "11" has is "80B80000". Because the value of the evaluation bit of this IP address Da is "1", the node with the node number of "11" is arranged in the lower right of the node with the node number of "2" as a parent node.

On the other hand, the IP address Da of the node with the node number of "3" is "800A0000". Because the value of the evaluation bit of this IP address Da is "0", the node with the node number of "3" is arranged in the lower left of the node with the node number of "2" as the parent node.

Hereinafter, the route tree of FIG. 3 can be structured in the same way. The route table shown in the table 1 can be provided based on the structured route tree.

When the route searching circuit 2 is used actually, the structuring and updating operations of the route tree needs to be performed. In order to structure the route tree, an exclusive use hardware circuitry for the route tree may be used or software by a CPU may be used.

Figure 4:
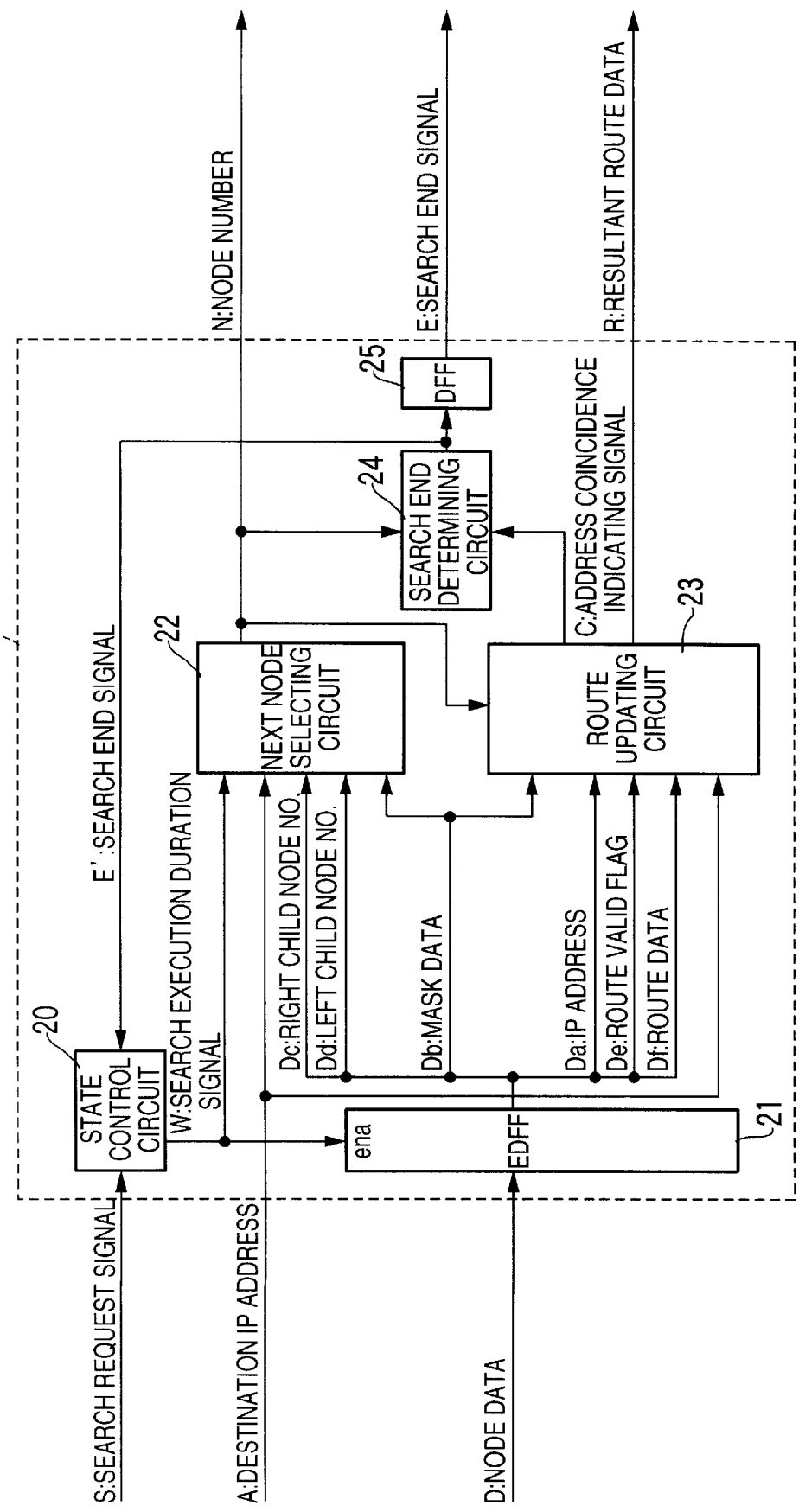
FIG. 4 is a block diagram illustrating the structure of a route searching circuit according to a first embodiment of the present invention.

FIG. 4 is a block diagram illustrating the structure of the route searching circuit 2. The route searching circuit 2 is composed of a state control circuit 20, a flip-flop (EDFF) 21 with an enable terminal, a next node selecting circuit 22, a route updating circuit 23, a search end determining circuit 24, and a flip-flop (DFF) 25.

The state control circuit 20 generates a search execution duration signal W which indicates whether or not the searching operation is being executed in response to two input signals, i.e., the search request signal S and the search end signal E'. The search execution duration signal W is set to a level indicating that the searching process is being executed, e.g., a high (H) level when the search request signal S is received. On the other hand, when the search end signal E' is received, the search execution duration signal W is set to a level indicating the end of the searching process, e.g., a low (L) level.

The node data D outputted from the route tree storing memory 3 is supplied to the EDFF 21. As mentioned above, the node data D is composed of an IP address Da, a mask data Db, a right child node number Dc, a left child node number Dd, a route valid flag De, and a route data Df. The EDFF 21 outputs the node data D in synchronous with the rising edge of the clock signal. Also, the search execution duration signal W is supplied to the enable terminal ena of the EDFF 21. The EDFF 21 updates the output only when the search execution duration signal W is in the level illustrating the execution of the searching process.

The next node selecting circuit 22 selects either one of the right child node number Dc or the left child node number Dd based on the mask data Db in the destination IP address A which is outputted from the input and output unit 1 and the node data D which is outputted from the route tree storing memory 3. The next node selecting circuit 22 outputs the selected number to the route tree storing memory 3 as the node number N.

The route updating circuit 23 compares the destination IP address A and the network address which is defined based on the IP address Da and the mask data Db to output the address coincidence indicating signal C representing the comparing result. This address coincidence indicating signal C has a level indicating coincidence, e.g., the high (H) level in this embodiment when the address comparing result indicates the coincidence, and a level indicating non-coincidence, e.g., the low (L) level when the address comparing result indicates the non-coincidence.

Then route updating circuit 23 updates the resultant route data R as its output to the route data Df in the node data D when the address comparing result indicates the coincidence and the route valid flag De is set to the value representing the validity. Also, the route updating circuit 23 holds the resultant route data R when the address comparing result indicates the non-coincidence or when the route valid flag De is set to the value representing invalidity.

The search end determining circuit 24 generates the search end signal E' of the "H" level when the node number N outputted from the next node selecting circuit 22 is the address which meets an end condition or when the address coincidence indicating signal C is set to the value representing the non-coincidence.

The DFF 25 outputs this search end signal E' to the input and output unit 1 as the search end signal E which is synchronized with the rising edge of the clock signal.

Figure 5:
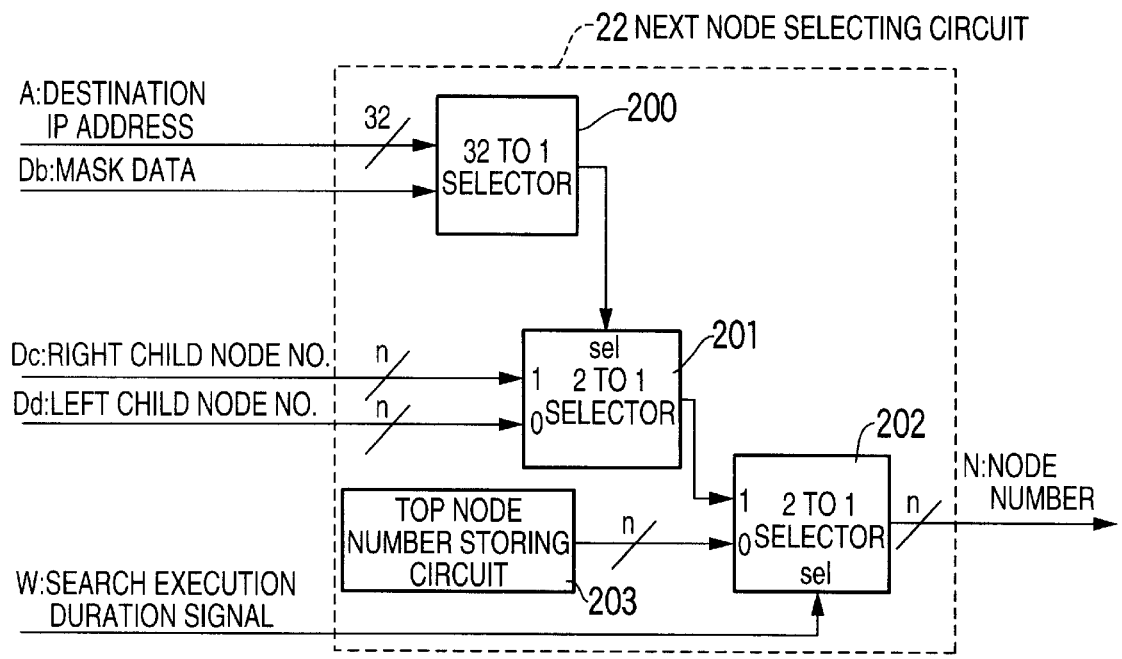
FIG. 5 is a block diagram illustrating the structure of a next node selecting circuit shown in FIG. 4.

FIG. 5 is a block diagram illustrating the structure of the next node selecting circuit 22. The next node selecting circuit 22 will be described below with reference to FIG. 5.

The next node selecting circuit 22 is 10 composed of a 32-1 selector 200, a 2-1 selector 201, a 2-1 selector 202, and a top node number storage circuit 203.

The 32-1 selector 200 extracts and outputs a 1 bit from the 32-bit destination IP address A based on the mask data Db. More specifically, when the mask length of the mask data Db is m, the (m+1)-th bit of the destination IP address A is extracted and outputted from the upper bit. The output of the 32-1 selector 200 is supplied to the control terminal sell of the 2-1 selector 201 as the selection signal.

The 2-1 selector 201 selects and outputs the right child node number Dc of the node data D, when the selection signal is "1", and selects and outputs the left child node number Dd of the node data D, when the selection signal is "0".

The search execution duration signal W is supplied to the control terminal sel of the 2-1 selector 202 as the selection signal. The 2-1 selector 202 selects and outputs the node number outputted from the 2-1 selector 201 when the search execution duration signal W is set to the level representing the execution of the searching process. Also, the 2-1 selector 202 selects and outputs the node number of the top node which is stored in the top node number storing circuit 203, when the search execution duration signal W is not set to the level representing the execution of the searching process.

Figure 6:
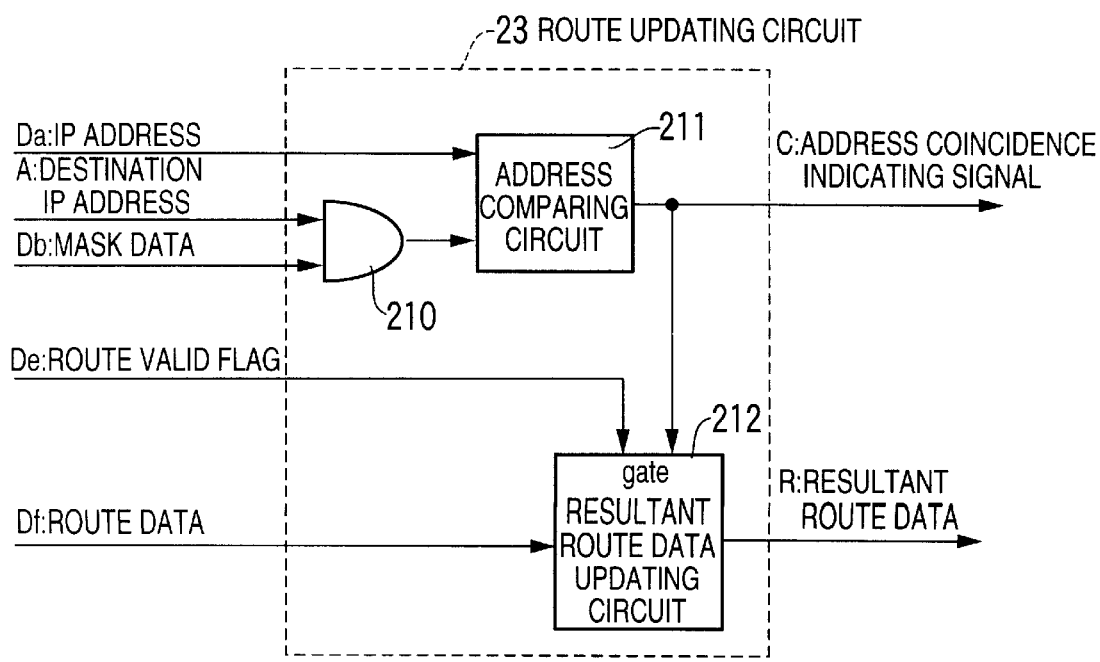
FIG. 6 is a block diagram illustrating the structure example of a route updating circuit of FIG. 4.

FIG. 6 is a block diagram illustrating the structure of the route updating circuit 23. The route updating circuit 23 will be described with reference to FIG. 6.

The route updating circuit 23 is composed of a mask processing circuit 210, an address comparing circuit 211, and a resultant route data updating circuit 212.

The mask processing circuit 210 outputs a part of the destination IP address A corresponding to the valid bit of the network address of the node by a masking process based on the destination IP address A and the mask data Db the node data D. More specifically, when the ask length of the mask data Db is m, a mask address is produced in which each of the upper m bits is "1" and each of the lower (32−m) bits is "0". A logical product of the mask address and the destination IP address A is calculated. As a result, an address is outputted in which a portion of the network address other than the portion corresponding to the valid bit.

The address comparing circuit 211 compares the IP address Da and the output of the mask processing circuit 210 to output the address coincidence indicating signal C indicating the comparing result. The address coincidence indicating signal C has the level representing the coincidence, e.g., the high (H) level in this embodiment, when the address comparing result indicates the coincidence, and the level representing the non-coincidence, e.g., the low (L) level in this embodiment, when the comparing result indicates the non-coincidence.

The resultant route data updating circuit 212 updates the resultant route data R as its output to the route data Df in synchronous with the clock signal, when the address coincidence indicating signal C indicates the coincidence and when the route valid flag De is set to the value indicating the validity. However, the resultant route data updating circuit 212 holds the resultant route data R when the route valid flag De is set to the value indicating invalidity or when the address coincidence indicating signal C is set to the level indicating the non-coincidence.

Next, the operation of the communication control apparatus using the route searching circuit 2 according to the first embodiment of the present invention will be described below. In this case, it supposes that the route table of the table 1 corresponding to the route tree of FIG. 3 is stored in the route tree storing memory 3. Also, the operation will be described, taking the case where the packet has the destination IP address A of "800A9011" is received as an example.

When the packet is received, the destination IP address A is supplied from the input and output unit 1 to the route searching circuit 2 together with the search request signal S. In the route searching circuit 2, the route data corresponding to the destination IP address A is searched while the node data as an object to be compared is read from the route tree storing memory 3. After the searching operation ends, the resultant route data R is outputted to the input and output unit 1 together with the search end signal E.

The detailed operation of the route searching circuit 2 will be described with the timing charts of FIGS. 7A to 7N.

In case that the search execution duration signal W is set to the "L" level to indicate that the searching process is not being executed, the 2-1 selector 202 of the next node selecting circuit 22 selects and outputs the output of the top node number storage circuit 203. Therefore, an initial value of the node number N which is outputted from the next node selecting circuit 22 is set to "1" which is the node number of the top node of the route tree, as shown in FIG. 7D. In this way, the initial value of the node data D which is outputted from the route tree storing memory 3 is the node data D1 of the top node with the node number "1", as shown in FIG. 6E.

When the search request signal S of the "H" level is received from the input and output unit 1, the state control circuit 20 sets the search execution duration signal W to the "H" level, as shown in FIG. 7C. When the search execution duration signal W is set to the "H" level, the EDFF 21 updates its output to the supplied node data D in synchronous with a rising edge of the lock signal.

Figure 7:
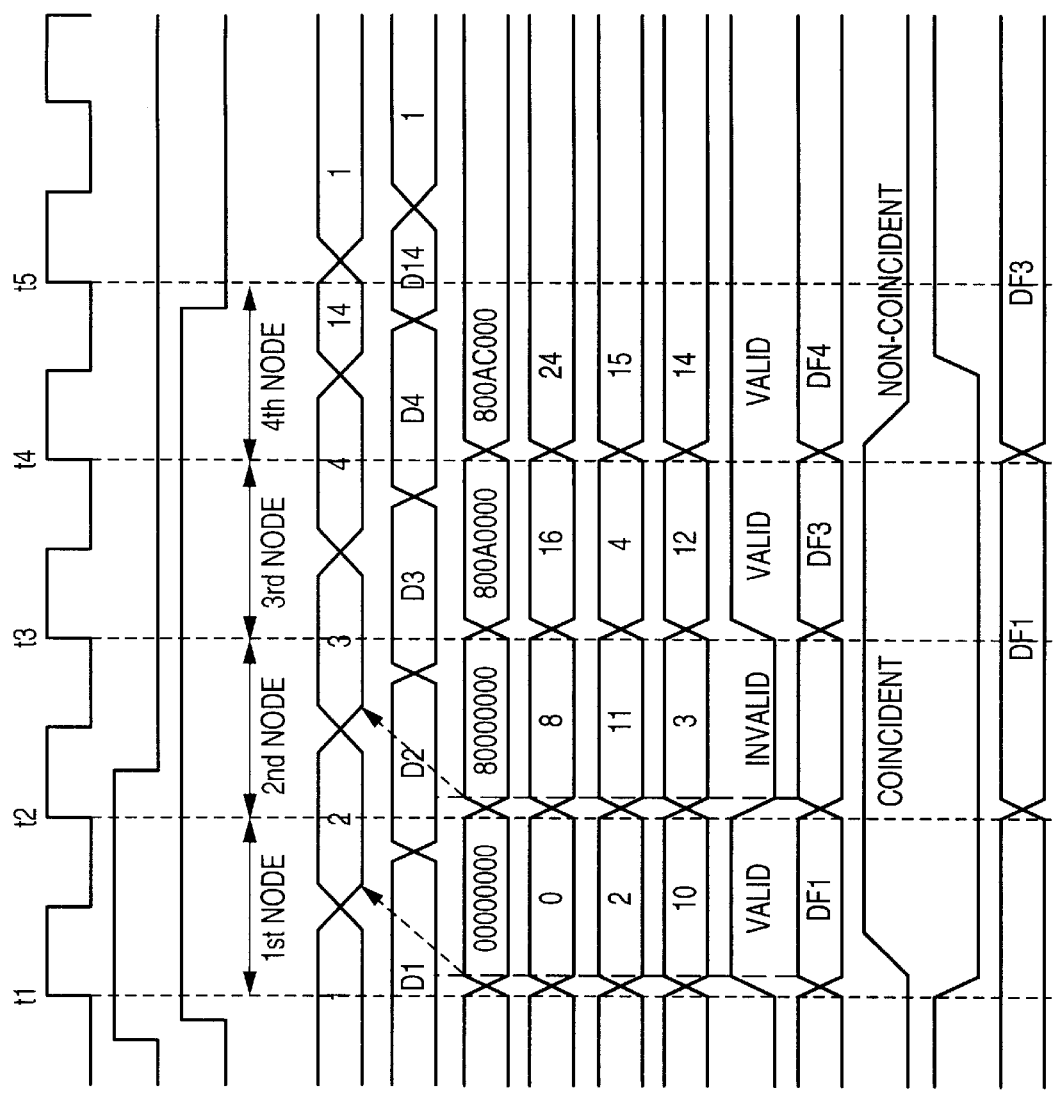
FIGS. 7A to 7N are timing charts to explain the operation of the route searching circuit of FIG. 3.

Therefore, the EDFF 21 outputs the node data D1 of the top node in synchronous with the rising edge of the clock signal which is used to start the first node processing (time t1 of FIG. 7). More specifically, the node data D1 of the top node is as follows: the IP address Da is "00000000", the mask data Db is "0", the right child node number Dc is "2", the left child node number Dd is "10", the route valid flag De is "1" (valid) and the route data Df is Df1.

The next node selecting circuit 22 selects one to be read next of the right child node number Dc and the left child node number Dd, based on the mask data Db of the node data D and the destination IP address A. More specifically, In the case where the mask length of the mask data Db is m, when the (M+1)-th bit from the uppermost bit of the destination IP address A is "1", the right child node number Dc is selected and is output. On the other hand, when the same bit is "0", the left child node number Dd is selected and is output.

As mentioned above, in the first node processing, the mask data Db is "0". Since the (0+1)-th bit from the uppermost of the destination IP address A of "800A9011" is "1", the node number to be read out next is the right child node number Dc. Thus, a value of "2" indicating the right child node number Dc is outputted from the next node selecting circuit 22 as node number N, as shown in FIG. 7D.

The route tree storing memory 3 outputs the node data D2 of the node with the node number of "2", when the node number of "2" is supplied, as shown in FIG. 7E. The node data D2 outputted from the route tree storing memory 3 is taken in by the EDFF 21 at the rising edge of the next clock signal, i.e., at the time t2 of FIG. 7. Thus, the first node processing ends and the second node processing is started.

The node data D2 has the IP address Da of "80000000", the mask data of "8", the right child node number Dc of "11", the left child node number Dd of "3", the route valid flag De of "0", and no route data.

In the second node processing, the next node selecting circuit 22 selects one to be read out next of the right child node number Dc and the left child node number Dd, as in the first node processing. In the second node processing, the mask data Db is "8". Because the ninth (=8+1) bit from the uppermost bit of the destination IP address A of "800A9011"

is "0", the node number to be read next is the left child node number Dd. Thus, as shown in FIG. 7D, the value of "3" of the left child node number Dd is outputted from the next node selecting circuit 22 as the node number N.

The route tree storing memory 3 outputs the node data D3 of the node with the node number of "3", when the node number of "3" is supplied, as shown in FIG. 7E. As mentioned above, the node number N of the node to be processed next in the next clock cycle is outputted for every clock cycle. Then, the node data D is read out from the route tree storing memory 3.

Next, the operation of the route updating circuit 23 of the route searching circuit 2 will be described below.

An address obtained by masking the destination IP address A by the mask processing circuit 210 using the mask data Db and the IP address Da of the node data D are compared by the address comparing circuit 211. The address comparing circuit 211 sets the address coincidence indicating signal C to the "H" level, when the address comparing result indicates coincidence.

The result route data updating circuit 212 pdates the resultant route data R as its output the route data Df in synchronous with the clock signal, when the address coincidence indicating signal C is set to the "H" level indicating the coincidence, and when the route valid flag De is set to the value indicating validity.

In the above-mentioned first node processing, the mask data Db is "0". Accordingly, even if the destination IP address A is any value, the output of the mask processing circuit 210 is "00000000" which is coincident with the IP address Da of "00000000". As a result, in case of the first node processing, the address coincidence indicating signal C is set to the "H" level indicating the coincidence, as shown in FIG. 7L.

The address coincidence indicating signal C is set to the "H" level indicating the coincidence and the route valid flag De is set to the value of "1" which indicates the validity. Therefore, the result route data updating circuit 212 updates the resultant route data R to the route data Df1 at the timing of the next rising edge of the clock signal, e.g., at the time t2 of FIG. 7N.

In the second node processing, mask data Db is "8". Accordingly, the upper 8 bits of the estination IP address A of "800A9011" is taken out and the output of the mask processing circuit 210 is set to "80000000". This value is coincident with the IP address Da of "80000000". As a result, in case of the second node processing, the address coincidence indicating signal C is set to the "H" level indicating the coincidence. In this case, however, because the route valid flag De is set to the value of "0" indicating the invalidity, the resultant route data R is not updated at the time of the rising edge of the next clock signal, as shown in FIG. 7 as time t3. As a result, the resultant route data R is held, as shown in FIG. 7N.

In the third node processing, the mask data Db is set in the value of "16". Accordingly, the upper 16 bits of the destination IP address A of "800A9011" are taken out and the output of the mask processing circuit 210 is set to the value of "800A0000". This value is coincident with the IP address Da of "800A0000". As a result, in case of the third node processing, the address coincidence indicating signal C is set to the of "H" level indicating coincidence. The result route data updating circuit 212 updates the resultant route data R to the route data Df3 at the time of the rising edge of the next clock signal, as shown in FIG. 7N at the time t4. This is because the address coincidence indicating signal C is set to the "H" level indicating the coincidence and moreover the route valid flag De is set to the value of "1" indicating the validity.

In the fourth node processing, the mask data Db is set to the value of "24". Accordingly, the upper 24 bits the destination IP address A of "800A9011" is taken out and the output of the mask processing circuit 210 is set to the value of "800A9000". This value is not coincident with the IP address Da of "800AC000". As a result, in the fourth node processing, the address coincidence indicating signal C is set to the "L" level indicating non-coincidence, as shown in FIG. 7L. Because the address coincidence indicating signal C is set to the "L" level indicating the non-coincidence, the resultant the route data R is not updated at the time of the rising edge of the next clock signal, i.e., the time t5 of FIG. 7. The resultant the route data R is maintained, as shown in FIG. 7N.

Next, the operation of the search ending determining circuit 24 will be described below.

The search ending determining circuit 24 generates the search end signal E' of the "H" level, when the node number N outputted from the next node selecting circuit 22 is the address which meets an end condition or when the address coincidence indicating signal C is set to the level indicating non-coincidence. More specifically, the above address when the node number N meets an ending condition means that there is no address to be read out next.

Referring to FIG. 7, in the fourth node processing, because the address coincidence indicating signal C is set to the "L" level indicating a non-coincidence, the search ending signal E' is set to the "H" level. When receiving the search end signal E' of the "H" level, the state control circuit 20 sets to the search execution duration signal W of the "L" level, as shown in FIG. 7C. The search execution duration signal W is set to the "L" level, the EDFF 21 stops the updating of the output. As a result, the resultant the route data R outputted from the route updating circuit 23 is maintained at the route data Df3. Then, since the search ending signal E' is set to of "H", this search end signal E' is outputted from the DFF 25 as the search end signal E at the rising edge of the next clock signal at the time t5 of FIG. 7.

When receiving the search end signal E of the "H" level, the input and output unit 1 receives the route data R at that time as the final resultant the route data. As a result, the input and output unit 1 determines the destination of the reception packet based on the route data R.

The communication control apparatus according to the second embodiment of the present invention will be described below.

Figure 8:
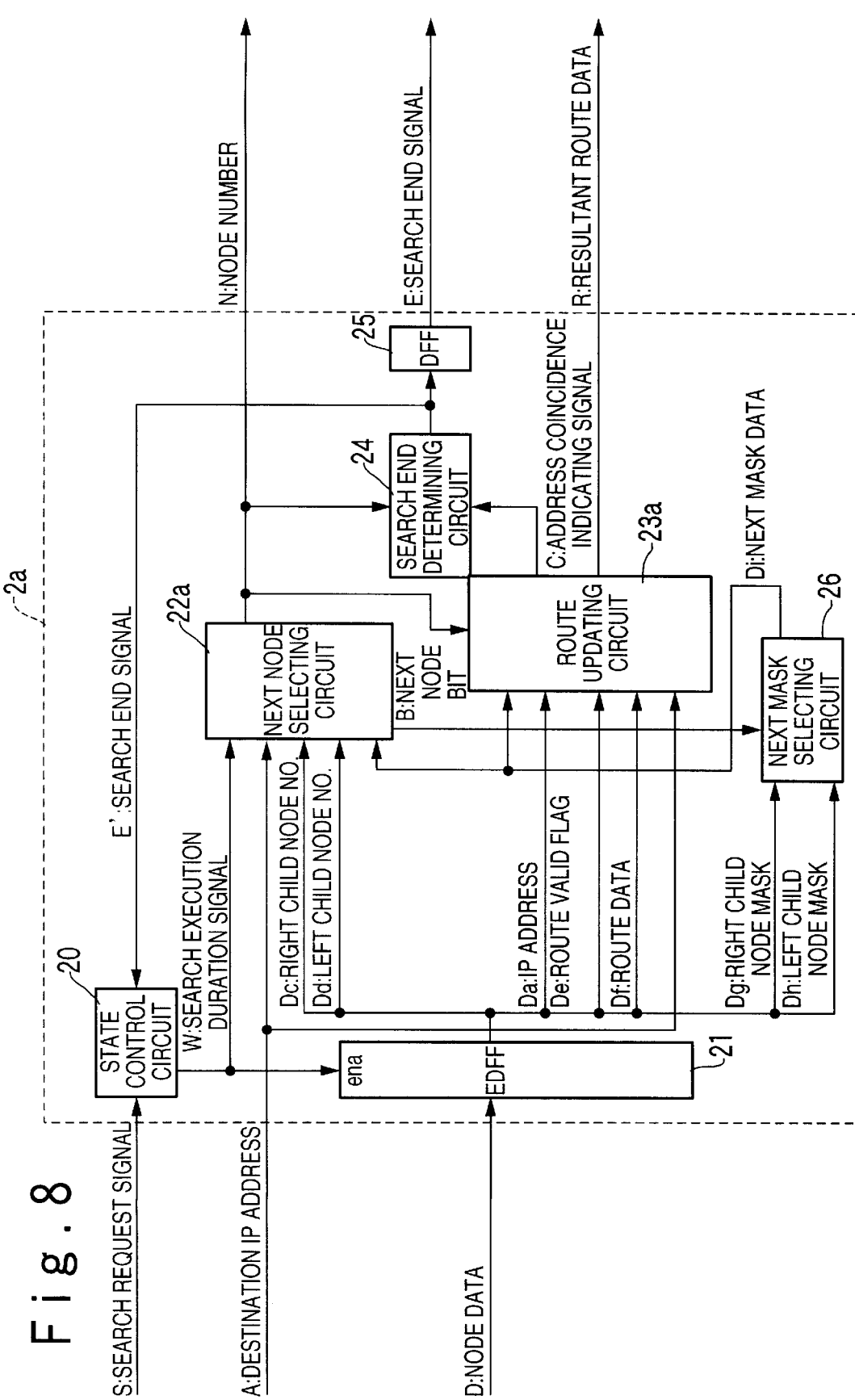
FIG. 8 is a block diagram illustrating the structure of the route searching circuit according to a second embodiment of the present invention.

FIG. 8 is a block diagram illustrating the structure of the route searching circuit of the present invention. The structure of the communication control apparatus in the second embodiment is same as that in the first embodiment shown in FIG. 2. However, in the second embodiment, the route searching circuit 2a is used instead of the route searching circuit 2 shown in FIG. 2.

The route searching circuits is composed of the state control circuit 20, the EDFF 21, a next node selecting circuit 22a, a route updating circuit 23a, the search ending determining circuit 24, the DFF 25, a next mask selecting circuit 26. The next mask selecting circuit 26 is newly provided as one unit connected to the output of the EDFF 21 in the route searching circuit 2 in the first embodiment.

A next node bit B, a right child node the mask Dg, and a left child node mask Dh are supplied to the next mask selecting circuit 26. The next node bit B is a signal indicating whether the node to be read out next is a right child node or a left child node. When the next node bit B is "0", the next node is the left child node. On the other hand, when the next node bit B is "1", the next node is the right child node.

The right child node mask Dg and the left child node mask Dh are data which are newly added to each node data D in the route table as the components of the node data D. The right child node mask Dg is the mask data of the right child node of the node read out currently. The left child node mask Dh is the mask data of the left child node of the node read out currently.

The next mask selecting circuit 26 selects either one of the right child node mask Dg and the left child node mask Dh in accordance with the next node bit B. The next mask selecting circuit 26 outputs the selected data as the next mask data 9i to the next node selecting circuit 22a and the route updating circuit 23a. In other words, the next mask selecting circuit 26 selects and outputs the left child node mask Dh when the next node bit B is "0", and selects and outputs the right child node mask Dg when the next node bit B is "1".

Figure 9:
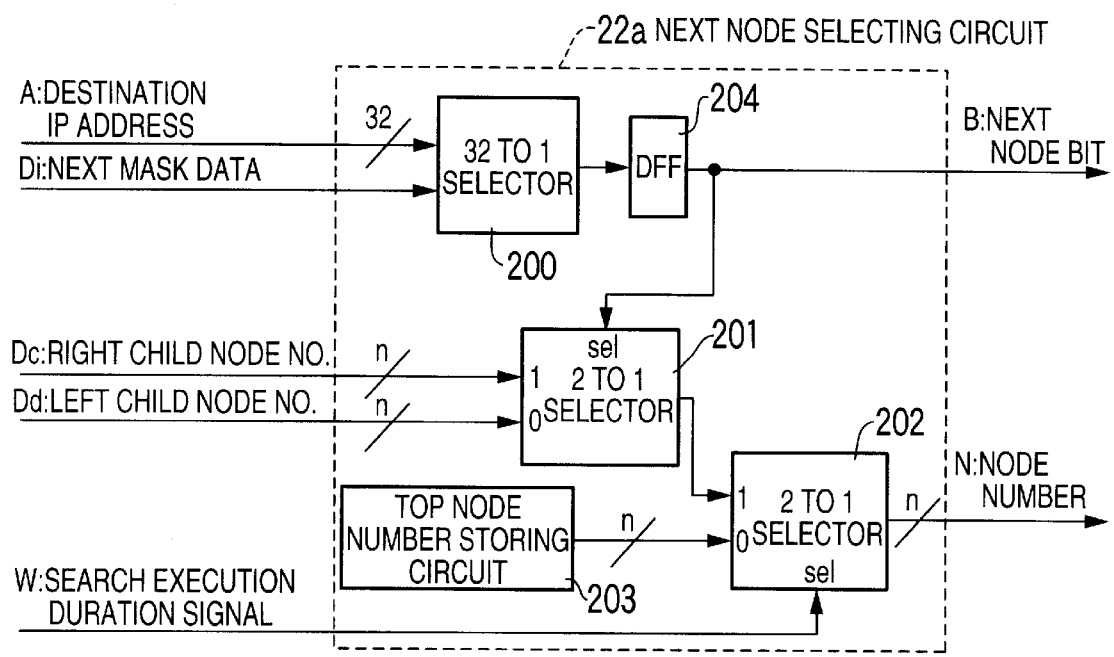
FIG. 9 is a block diagram illustrating the structure of a next node selecting circuit of FIG. 8.

FIG. 9 is a block diagram illustrating the structure example of the next node selecting circuit 22a in the second embodiment. Referring to FIG. 9, the next node selecting circuit 22a is composed of the 32-1 selector 200, the 2-1 selector 201, the 2-1 selector 202, the top node number storage circuit 203, a flip-flop (DFF) 204. The DFF 204 is newly provided between the 32-1 selector 200 and the 2-1 selector 201 in addition to the next node selecting circuit 22 in the first embodiment.

The mask data supplied to the 32-1 selector 200 is the next mask data 9i. Because this next mask data 9I is the data which becomes necessary in case of node processing in the next clock cycle, the output of the 32-1 selector 200 is delayed by 1 clock by the DFF 204. Thus, the synchronization can be established. The next node bit B is the output of the DFF 204, and supplied to the 2-1 selector 201 and the next mask selecting circuit 26.

It should be noted that the DFF 204 outputs the 0th bit from the uppermost bit of the destination IP address A, i.e., the most significant bit as an initial value of the next node bit B, when the search execution duration signal W is set to the "L" level indicating that the operation is not during execution of the searching process. The other operation is same as in the first embodiment.

By adopting such a structure, in this embodiment, because the bit select processing in the 32-1 selector 200 can be executed in the clock cycle before one cycle, the processing time required to output the node number N can be reduced.

Figure 10:
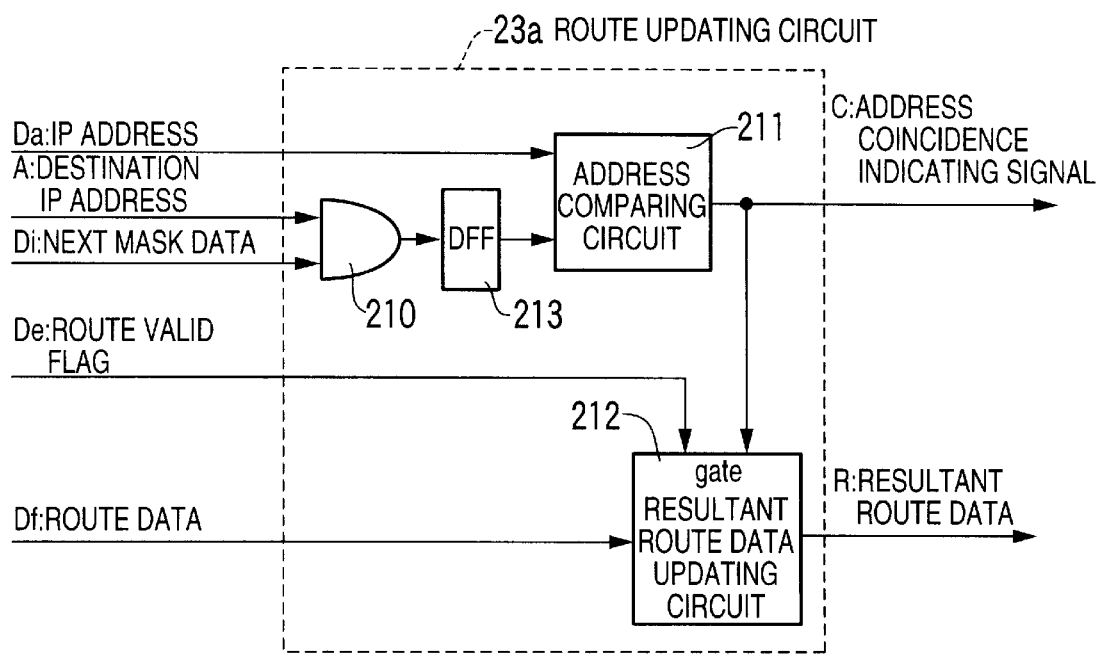
FIG. 10 is a block diagram illustrating the structure of a route updating circuit of FIG. 8.

FIG. 10 is a block diagram illustrating the structure example of the route updating circuit 23a in the second embodiment. The route updating circuit 23a is composed of the mask processing circuit 210, the address comparing circuit 211, the resultant the route data updating circuit 212, and a flip-flop (DFF) 213. The DFF 213 is newly provided between the mask processing circuit 210 and the address comparing circuit 211 in addition to the route updating circuit 23 in the first embodiment.

The mask data supplied to the mask processing circuit 210 is the next mask data 9i. Because the next mask data 9I is the data which becomes necessary in case of node processing in the next clock cycle, the output of the mask processing circuit 210 is delayed by 1 clock by the DFF 213. Thus, the synchronization is established. By adopting such a structure in the second embodiment, the mask processing by the mask processing circuit 210 can be executed in the clock cycle before by one, the processing time required to output the address coincidence indicating signal C and the resultant the route data R can be reduced.

As mentioned above, the next mask data 9i as the mask data Db of the node data D to be read in the next clock cycle is earlier outputted from the next mask selecting circuit 26. In this way, because the processing relating to the mask data Db is earlier executed by one clock cycle, the processing time required in the next node selecting circuit 22a and the route updating circuit 23a can be reduced. Also, the clock frequency required to operate the route searching circuit 23a can be increased to a higher frequency. Because the clock frequency can be increased to the higher frequency, the retrieval time of the route searching circuit 22a can be made short.

Next, the communication control apparatus according to the third embodiment of the present invention will be described below.

In the first and second embodiments, it is supposed that the route data Df in the route table is the address which is peculiar to the transmission destination apparatus. If this the route data Df is a pointer to the data which is necessary to transmit the reception packet, e.g., the value which is identical with the node number, the capacity of the route tree storing memory 3 can be reduced, because the route tree table is not necessary to have the route data (address) Df as the component of the node data D. As a result, an interface part of the route searching circuit can be made small in size. In this case, however, means for acquiring a necessary route data to transmit a reception packet from the above pointer must be provided for the input and output unit 1.

It should be noted that in the above embodiments, the descriptions are given using the route data retrieval from the destination IP address as examples. However, the present invention is not limited to this. The present invention can be applied to the route searching process in which the apparatus for a packet to be transmitted next is determined based on an address which specifies a communication destination.

Also, in the above embodiment, the route tree storing memory is provided outside the route searching circuit. However, the route tree storing memory may be provided in the route searching circuit.

As described above, according to the present invention, the address solving process can be executed at high speed to light the load of the CPU. As a result, the throughput of the processing in the communication control apparatus can be increased. This is because the address solving process is executed by the selecting process and the route data determining process are executed by the exclusive use hardware so that each entry can be for 1 clock cycle.

Also, the route searching circuit can be made small in size. Even if the number of entries in the route table increases, the route searching circuit never becomes large in size. This is because in the route searching circuit, only one route entry is always read, and the comparing process is performed. Therefore, even if the number of entries in the route table increases, it is sufficient to make the capacity of the route tree storing memory large.

Also, even when the destination address is coincident with the network addresses of a plurality of route entries in the route table, the route data corresponding to the network address which has the longest network mask is searched. Therefore, even if the present invention can be applied to the network in which the destination address has the possibility to coincident with the plurality of network addresses, like the IP address. This is because the route data updating process is performed based on the address comparison in parallel with the processing for determining the next route entry. When the address comparison indicates the coincidence, the resultant route data is updated, and when the address comparison indicates non-coincidence, the resultant route data is maintained. In the route tree, the mask length becomes long in order of the read route entry. Therefore, the route data of the route entry in which the address comparison result finally indicates coincidence is maintained. Thus, the route data corresponding to the network address which has the longest network mask can be searched.

What is claimed is:

1. A communication control apparatus comprising:
   an input and output unit responsive to reception of a packet, for generating a search request and a destination address of said packet to receive a resultant route data, and for transmitting said packet based on said resultant route data;
   a memory for storing a route tree table having a tree structure of a plurality of nodes, each of which has a node data; and
   a route searching circuit for referring to said route tree table in response to said search request to determine a route data of a final node data as said resultant route data from said destination address, and for outputting said resultant route data to said input and output unit,
   wherein said route searching circuit includes a next node selecting circuit for referring to said route tree table using said destination address and a mask data in response to said search request to retrieve a first next node data, for repeatedly referring to said route tree table using an address and mask data of a current node data to retrieve a second next node data, while said first next node data or said second next node data is set as said current node data, until said final node data is obtained, and
   wherein said next node selecting circuit selects one of a left child node and a right child node based on a (said mask data +1)-th bit of said destination address.

2. A communication control apparatus according to claim 1, wherein said next node selecting circuit refers to said route tree table based on a node number, and
   wherein said next node selecting circuit includes:
      a first selector for determining an evaluation bit based on said mask data and said destination address;
      a second selector for selecting one of a number of said left child node and a number of said right child node based on said evaluation bit;
      a storing circuit for storing a top node number; and
      a third selector for selecting one of a top node number and said selected child node number in response to said search request.

3. A communication control apparatus comprising:
   an input and output unit responsive to reception of a packet, for generating a search request and a destination address of said packet to receive a resultant route data, and for transmitting said packet based on said resultant route data;
   a memory for storing a route tree table having a tree structure of a plurality of nodes, each of which has a node data; and
   a route searching circuit for referring to said route tree table in response to said search request to determine a route data of a final node data as said resultant route data from said destination address, and for outputting said resultant route data to said input and output unit,
   wherein said route searching circuit includes a next node selecting circuit for referring to said route tree table using said destination address and a mask data in response to said search request to retrieve a first next node data, for repeatedly referring to said route tree table using an address and mask data of a current node data to retrieve a second next node data, while said first next node data or said second next node data is set as said current node data, until said final node data is obtained,
   wherein said route searching circuit further includes a route updating circuit for selectively updating a held route data to a route data of said first or second next node data,
   wherein said route updating circuit updates the held route data to said route data of said first or second next node data, when a logical product of said mask data and said destination address is coincident with an address of said first or second next node data, and
   wherein said route updating circuit includes:
      a masking circuit for masking said destination address using said mask data, to obtain a masked destination address;
      an address comparing circuit for comparing said masked destination address and said address of said first or second next node data; and
      a resultant route data updating circuit for updating the held route data to said route data of said first or second next node data, when said masked destination address is coincident with said address of said first or second next node data, and when a validity data of said first or second next node data indicates that said route data of said first or second next node data is valid.

4. A communication control apparatus comprising:
   an input and output unit responsive to reception of a packet, for generating a search request and a destination address of said packet to receive a resultant route data, and for transmitting said packet based on said resultant route data;
   a memory for storing a route tree table having a tree structure of a plurality of nodes, each of which has a node data; and
   a route searching circuit for referring to said route tree table in response to said search request to determine a route data of a final node data as said resultant route data from said destination address, and for outputting said resultant route data to said input and output unit,
   wherein said route searching circuit includes a next node selecting circuit for referring to said route tree table using said destination address and a predetermined mask data in response to said search request to retrieve a first next node data, for repeatedly referring to said route tree table using an address and mask data of a current node data to retrieve a second next node data, while said first next node data or said second next node data is set as said current node data, until said final node data is obtained, and
   wherein said route searching circuit includes a next mask selecting circuit for selecting one of a right child node mask data and left child node mask data of said route data as a selected child node mask data for a next clock cycle based on an evaluation bit determined based on said destination address and said selected child node mask data for a current clock cycle.

5. A communication control apparatus according to claim 4, wherein said route searching circuit includes a next node selecting circuit for referring to said route tree table using said destination address and a predetermined mask data in response to said search request to retrieve a first next node data including said right child node mask data and said left child node mask data, for repeatedly referring to said route tree table using an address of a current node data and said selected child node mask data to retrieve a second next node data including said right child node mask data and said left child node mask data, while said first next node data or said second next node data is set as said current node data, until said final node data is obtained.

6. A communication control apparatus according to claim 5, wherein said route tree table has a dichotomy tree structure, and each of said plurality of nodes as a parent node is connected to a left child node and a right child node, and
said next node selecting circuit selects one of said left child node and said right child node based on a set of said destination address and a predetermined mask data or a set of said address of said current node data and said selected child node mask data each time said route tree table is referred to.

7. A communication control apparatus according to claim 4, wherein said next node selecting circuit selects one of said left child node and said right child node based on a (said selected child node mask data +1)-th bit of said destination address.

8. A communication control apparatus according to claim 7, wherein said next node selecting circuit refers to said route tree table based on a node number, and
wherein said next node selecting circuit includes:
a first selector for determining an evaluation bit based on said selected child node mask data and said destination address in said current clock cycle;
a flip-flop circuit for holding said evaluation bit to output in said next clock cycle;
a second selector for selecting one of a number of said left child node and a number of said right child node based on said evaluation bit in said next clock cycle;
a storing circuit for storing a top node number; and
a third selector for selecting one of said top node number and said selected child node number in said next clock cycle in response to said search request.

9. A communication control apparatus according to claim 4, wherein said route searching circuit further includes a search end determining circuit for determining whether said final node data is obtained.

10. A communication control apparatus according to claim 9, wherein said search end determining circuit determines that said final node data is obtained, when there is no node to be referred to or when said second next node data includes an invalidity indicating data.

11. A communication control apparatus according to claim 4, wherein said route searching circuit further includes a route updating circuit for selectively updating a held route data to a route data of said first or second next node data.

12. A communication control apparatus according to claim 11, wherein said route updating circuit updates the held route data to said route data of said first or second next node data, when a logical product of said selected child node mask data and said destination address is coincident with said address of said first or second next node data.

13. A communication control apparatus according to claim 12, wherein said route updating circuit includes:
a masking circuit for masking said destination address using said mask data in said current clock cycle;
a flip-flop for holding said masked destination address to output in said next clock cycle;
an address comparing circuit for comparing said masked destination address and said address of said first or second next node data in said next clock cycle; and
a resultant route data updating circuit for updating the held route data to said route data of said first or second next node data in said next clock cycle, when said masked destination address is coincident with said address of said first or second next node data, and when a validity data of said first or second next node data indicates that said route data of said first or second next node data is valid.

14. A method of determining a route to a destination unit based on a destination address of a packet in a communication control apparatus, comprising the steps of:
generating a search request and a destination address of a packet;
referring to a route tree table in response to said search request to determine a route data of a final node data as a resultant route data from said destination address, said route tree table having a tree structure of a plurality of nodes, each of which has a node data; and
transmitting said packet to a destination unit based on said resultant route data,
wherein said referring step includes:
repeatedly referring to said route tree table using said destination address and a mask data or using an address and mask data of a current node data to retrieve a second next node data, while a first next node data or a second next node data is set as said current node data, until a final node data is obtained,
wherein said repeatedly referring step includes selecting one of a left child node and a right child node based on a (said mask data +1)-th bit of said destination address.

15. A method according to claim 14, wherein said repeatedly referring step includes:
determining an evaluation bit based on said mask data and said destination address;
selecting one of a number of said left child node and a number of said right child node based on said evaluation bit; and
selecting one of a top node number and said selected child node number in response to said search request, said route tree table being referred to using said selected node number.

16. A method of determining a route to a destination unit based on a destination address of a packet in a communication control apparatus, comprising the steps of:
generating a search request and a destination address of a packet;
referring to a route tree table in response to said search request to determine a route data of a final node data as said resultant route data from said destination address, said route tree table having a tree structure of a plurality of nodes, each of which has a node data; and
transmitting said packet to a destination unit based on said resultant route data,
wherein said referring step includes:
repeatedly referring to said route tree table using said destination address and a predetermined mask data or using an address and mask data of a current node data to retrieve a first next node data and a second next node data, while said first next node data or said second next node data is set as said current node data, until said final node data is obtained, wherein said repeatedly referring step includes selecting one of a right child node mask data and left child node mask data of said route data as a selected child node mask data for a next clock cycle based on an evaluation bit determined based on said destination address and said selected child node mask data for a current clock cycle.

17. A method of determining a route to a destination unit based on a destination address of a packet in a communication control apparatus, comprising the steps of:

generating a search request and a destination address of a packet;

referring to a route tree table in response to said search request to determine a route data of a final node data as a resultant route data from said destination address, said route tree table having a tree structure of a plurality of nodes, each of which has a node data; and transmitting said packet to a destination unit based on said resultant route data, wherein said referring step includes:

repeatedly referring to said route tree table using said destination address and a predetermined mask data or using an address and mask data of a current node data to retrieve a first next node data and a second next node data, while said first next node data or said second next node data is set as said current node data, until said final node data is obtained, and wherein said referring step further includes:

selecting one of a left child node and a right child node, as a selected child node having selected child node mask data, and selecting one of said left child node and said right child node based on a (said selected child node mask data +1)-th bit of said destination address.

18. A method of determining a route to a destination unit based on a destination address of a packet in a communication control apparatus, comprising the steps of:

generating a search request and a destination address of a packet;

referring to a route tree table in response to said search request to determine a route data of a final node data as a resultant route data from said destination address, said route tree table having a tree structure of a plurality of nodes, each of which has a node data; and transmitting said packet to a destination unit based on said resultant route data, wherein said referring step includes:

repeatedly referring to said route tree table using said destination address and a predetermined mask data or using an address and mask data of a current node data to retrieve a first next node data and a second next node data, while said first next node data or said second next node data is set as said current node data, until said final node data is obtained, wherein said repeatedly referring step includes:

determining an evaluation bit based on a selected child node mask data and said destination address in a current clock cycle;

holding said evaluation bit to output in a next clock cycle;

selecting one of a number of a left child node and a number of a right child node, to obtain a selected child node number, based on said evaluation bit in said next clock cycle; and selecting one of a top node number and said selected child node number in said next clock cycle in response to said search request.

19. A method of determining a route to a destination unit based on a destination address of a packet in a communication control apparatus, comprising the steps of:

generating a search request and a destination address of a packet;

referring to a route tree table in response to said search request to determine a route data of a final node data as a resultant route data from said destination address, said route tree table having a tree structure of a plurality of nodes, each of which has a node data; and transmitting said packet to a destination unit based on said resultant route data, wherein said referring step includes:

repeating referring to said route tree using said destination address and a mask data or using an address of a current node data and one of a right child node mask data and a left child node mask data as a selected child node mask data to retrieve a first next node data and a second next node data including a right child node mask data and a left child node mask data, while said first next node data or said second next node data is set as said current node data, until said final node data is obtained, wherein said repeatedly referring step includes selectively updating a held route data to a route data of said first or second next node data, wherein said selectively updating step includes updating the held route data to said route data of said first or second next node data, when a logical product of said selected child node mask data and said destination address is coincident with said address of said first or second next node data, wherein said updating step includes:

masking said destination address using said mask data in a current clock cycle, to obtain a masked destination address;

holding said masked destination address to output in a next clock cycle;

comparing said masked destination address and an address of said first or second next node data in said next clock cycle; and updating the held route data to said route data of said first or second next node data in said next clock cycle, when said masked destination address is coincident with said address of said first or second next node data, and when a validity data of said first or second next node data indicates that said route data of said first or second next node data is valid.

\* \* \* \* \*